(12) United States Patent
Xu et al.

(10) Patent No.: US 9,298,693 B2
(45) Date of Patent: Mar. 29, 2016

(54) RULE-BASED GENERATION OF CANDIDATE STRING TRANSFORMATIONS

(75) Inventors: Gu Xu, Beijing (CN); Hang Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1138 days.

(21) Appl. No.: 13/328,956

(22) Filed: Dec. 16, 2011

(65) Prior Publication Data

US 2013/0159318 A1    Jun. 20, 2013

(51) Int. Cl.
*G06F 17/30* (2006.01)
*G06F 17/27* (2006.01)
*G06F 17/22* (2006.01)

(52) U.S. Cl.
CPC .......... *G06F 17/273* (2013.01); *G06F 17/2282* (2013.01)

(58) Field of Classification Search
CPC ................. G06F 17/273; G06F 17/30088
USPC ....................................................... 707/748
See application file for complete search history.

(56) References Cited

U.S. PATENT DOCUMENTS

| | | | |
|---|---|---|---|
| 7,266,537 B2* | 9/2007 | Jacobsen et al. | 706/62 |
| 7,321,892 B2* | 1/2008 | Vadon et al. | 707/767 |
| 7,366,983 B2* | 4/2008 | Brill et al. | 715/257 |
| 7,464,084 B2* | 12/2008 | Huang et al. | 1/1 |
| 7,584,093 B2 | 9/2009 | Potter et al. | |
| 8,032,546 B2* | 10/2011 | Arasu et al. | 707/769 |
| 8,706,753 B2* | 4/2014 | Pozin | 707/769 |
| 2005/0251744 A1* | 11/2005 | Brill | G06F 17/273 715/257 |
| 2008/0147642 A1* | 6/2008 | Leffingwell | G06F 17/30864 |
| 2008/0275837 A1 | 11/2008 | Lambov | |
| 2009/0083255 A1* | 3/2009 | Li | 707/5 |
| 2009/0164890 A1* | 6/2009 | Zhu | G06F 17/273 715/257 |
| 2009/0171955 A1 | 7/2009 | Merz et al. | |
| 2009/0248657 A1* | 10/2009 | Chellapilla | G06F 17/30864 |
| 2010/0077161 A1* | 3/2010 | Stoakes et al. | 711/162 |
| 2010/0125594 A1* | 5/2010 | Li et al. | 707/758 |
| 2011/0038531 A1* | 2/2011 | Arasu et al. | 382/155 |
| 2011/0295897 A1* | 12/2011 | Gao | G06F 17/30864 707/780 |
| 2012/0246133 A1* | 9/2012 | Hsu | G06F 17/276 707/706 |
| 2013/0054586 A1* | 2/2013 | Pozin | G06F 17/30979 707/728 |
| 2013/0124492 A1* | 5/2013 | Gao et al. | 707/706 |

OTHER PUBLICATIONS

Ahmad et al, "Learning a Spelling Error Model from Search Query Logs", Proc of conf on Human Language Technology and Empirical Methods in Natural Language Processing, Oct. 2005, pp. 955-962.
Aho et al, "Efficient String Matching: An Aid to Bibliographic Search", Communications of the ACM, Jun. 1975, vol. 18, No. 6, pp. 333-340.
Behm et al, "Space Constrained Gram Based Indexing for Efficient Approximate String Search", Proc 2009 IEEE Intl Conf on Data Engineering, Mar. and Apr. 2009, pp. 604-615.

(Continued)

*Primary Examiner* — Noosha Arjomandi
(74) *Attorney, Agent, or Firm* — Steve Wight; Sandy Swain; Micky Minhas

(57) ABSTRACT

Candidate string transformations may be generated from applying applicable transformation rules from a rules index. Candidate string transformations may be eliminated based on a score associated with the candidate string transformation. The score may be based on probabilistic values associated with the applied applicable transformation rules.

16 Claims, 12 Drawing Sheets

(56) References Cited

OTHER PUBLICATIONS

Brill et al, "An Improved Error Model for Noisy Channel Spelling Correction", In Proceedings of the 38th Annual Meeting on Association for Computational Linguistics, Jan. 2000, pp. 286-293.

Chen et al, "Improving Query Spelling Correction Using Web Search Results", In Proceedings of the 2007 Joint Conference on Empirical Methods in Natural Language Processing and Computational Natural Language Learning, Aug. 2007, pp. 181-189.

Duan, et al., "Online Spelling Correction for Query Completion", In Proceedings of the 20th International Conference on World Wide Web, Mar. 28-Apr. 1, 2011, pp. 117-126.

Ganjisaffar, et al., "qSpell: Spelling Correction of Web Search Queries using Ranking Models and Iterative Correction", In Proceedings of Spelling Alteration for Web Search Workshop, Jul. 2011, 5 pages.

Golding et al, "A Winnow Based Approach to Context Sensitive Spelling Correction", Mach. Learn. Feb. 1999, vol. 34, pp. 107-130.

Gollapudi, et al., "A Dictionary for Approximate String Search and Longest Prefix Search", In Proceedings of the 15th ACM International Conference on Information and Knowledge Management, Nov. 6-11, 2006, pp. 768-775.

Islam et al, "Real Word Spelling Correction Using Google Web IT 3 Grams", In Proceedings of the 2009 Conference on Empirical Methods in Natural Language Processing, Aug. 2009, vol. 3, pp. 1241-1249.

Jones et al, "Generating Query Substitutions", In Proceedings of the 15th Intl Conference on World Wide Web, May 2006, pp. 387-396.

Li et al, "Efficient Merging and Filtering Algorithms for Approximate String Searches", In Proceedings of the 2008 IEEE 24th International Conference on Data Engineering, Apr. 2008, pp. 257-266.

Li et al, "Exploring Distributional Similarity Based Models for Query Spelling Correction", In Proceedings of the 21st International Conference on Computational Linguistics and the 44th annual meeting of the Association for Computational Linguistics, Jul. 2006, pp. 1025-1032.

Li et al, "VGRAM: Improving Performance of Approximate Queries on String Collections Using Variable Length Grams", In Proceedings of the 33rd Intl Conf on Very Large Data Bases, Sep. 2007, pp. 303-314.

McCallum et al, "A Conditional Random Field for Discriminatively Trained Finite State String Edit Distance", In Conference on Uncertainty in Artificial Intelligence, Jul. 2005, 8 pgs.

Mihov et al, "Fast Approximate Search in Large Dictionaries", Comput. Linguist., Mar. 2004, vol. 30, No. 4, pp. 451-477.

Okazaki et al, "A Discriminative Candidate Generator for String Transformations", In Proceedings of the Conference on Empirical Methods in Natural Language Processing, Oct. 2008, pp. 447-456.

Oncina et al, "Learning Unbiased Stochastic Edit Distance in the Form of a Memoryless Finite State Transducer", In International Joint Conference on Machine Learning, Workshop: Grammatical Inference Applications: Successes and Future Challenges, Dec. 2005, 7 pgs.

Ristad et al, "Learning String Edit Distance", IEEE Trans. Pattern Anal. Mach. Intell., May 1998, vol. 20, No. 5, pp. 522-532.

Schaback et al, "Multi Level Feature Extraction for Spelling Correction", In 20th Intl Joint Conf on Artifical Intelligence, Jan. 2007, Workshop on Analytics for Noisy Unstructured Text Data, pp. 79-86.

Toutanova et al, "Pronunciation Modeling for Improved Spelling Correction", In Proceedings of the 40th Annual Meeting on Association for Computational Linguistics, Jul. 2002, pp. 144-151.

Vernica et al, "Efficient Top k Algorithms for Fuzzy Search in String Collections", In Proceedings of the First International Workshop on Keyword Search on Structured Data, Jun. 2009, pp. 9-14.

Whitelaw et al, "Using the Web for Language Independent Spellchecking and Autocorrection", In Proceedings of the 2009 Conference on Empirical Methods in Natural Language Processing: vol. 2, Aug. 2009, pp. 890-899.

Yang et al, "Cost Based Variable Length Gram Selection for String Collections to Support Approximate Queries Efficiently", In Proceedings of the 2008 ACM SIGMOD international conference on Management of data, Jun. 2008, pp. 353-364.

Yang et al, "Fast Algorithms for Top k Approximate String Matching", In Proceedings of the Twenty-Fourth AAAI Conference on Artificial Intelligence, Jul. 2010, pp. 1467-1473.

\* cited by examiner

| | Dynamic Programming and Top $k$ Pruning |
|---|---|
| | Input: rule index $R_I$, input string segmentation $s$, candidate number $K$ |
| | Output: Candidates strings with rank scores $S_K$ |
| 1 | begin |
| 2 |     Find all the occurrences of $\alpha$s from $R_I$ in $s$ with Aho-Corasick algorithm |
| 3 |     $minscore = -\infty$ |
| 4 |     $S_{trace} = S_K = \{\}$ |
| 5 |     Add $(1, \hat{\,}, 0)$ into $S_{trace}$ |
| 6 |     while $S_{trace}$ *is NOT empty* do |
| 7 |         Pickup a status $(pos, string, score)$ from $S_{trace}$ with heuristics |
| 8 |         if $score \leq minscore$ then |
| 9 |             continue |
| 10 |         if $pos == \|s\|$ AND *string reaches* \$ then |
| 11 |             if $\|S_K\| \geq K$ then |
| 12 |                 Remove candidate with minimum score from $S_K$ |
| 13 |             Add candidate $(string, score)$ into $S_K$ |
| 14 |             Update $minscore$ minimum score in $S_K$ |
| 15 |         foreach *next substring $c$ at $pos$* do |
| 16 |             $\alpha \to \beta$ = corresponding rule of $c$ |
| 17 |             $pos' = pos + \|\alpha\|$ |
| 18 |             $string' = string + \beta$ |
| 19 |             $score' = score + \lambda_{\alpha \to \beta}$ |
| 20 |             Add $(pos', string', score')$ into $S_{trace}$ |
| 21 |             if exists $(pos', string', score'')$ in $S_{trace}$ then |
| 22 |                 Drop the status with smaller score |
| 23 | return $S_K$ |

Fig. 6

RULE-BASED GENERATION OF CANDIDATE STRING TRANSFORMATIONS

BACKGROUND

String transformations may be useful in correcting a spelling error, generating alternate queries, and reformulating queries. However, often the techniques used to generate candidate string transformations are either accurate or efficient, but not both. Often an approach focuses on, and provides, one at the expense of the other.

For example, Hadjieleftheriou discusses employing machine learning to generate an accurate transformation model over efficiency. Hadjieleftheriou and Li, "Efficient approximate search on string collections," Proc. VLDB Endow., vol. 2, pp. 1660-1661, August 2009. In comparison, Yang discusses using efficient data structures with a fixed similarity model limiting accuracy. Yang, Yu, and Kitsuregawa, "Fast algorithms for top-k approximate string matching," in Proceedings of the Twenty-Fourth AAAI Conference on Artificial Intelligence, ser. AAAI '10, 2010, pp. 1467-1473.

This may cause problems for the user or the application interested in fast and accurate string transformations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes techniques for generating candidate string transformations. The transformation rules used to generate these candidate string transformations may be extracted from training data and expanded to include additional transformation rules. The extracted and expanded transformation rules may be associated with weights, the weights based on probabilities that the transformation rules may assist in generating candidate string transformations. A rule index may be constructed based at least in part on the extracted transformation rules, expanded transformation rules, and/or weights.

The rules of this rules index may then be applied in response to receiving a search string in order to generate candidate string transformations for the search string. Scores may be associated with candidate string transformations, where the scores may be based at least in part on weights associated with the respective transformation rules used to generate the candidate string transformations. Candidate string transformations may be eliminated at various stages of the generation and candidate construction process. The elimination of candidate string transformations may be based at least in part on the scores of the candidate string transformations at various stages of candidate string transformation construction. The elimination of candidate string transformations may further comprise eliminating entire candidate string transformation branches or limbs, for example, through pruning. Further, a dictionary may be used to aid in elimination of candidate string transformations.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

FIG. 6 shows an illustrative embodiment of a dynamic programming and top k pruning algorithm.

DETAILED DESCRIPTION

Overview

This disclosure describes techniques to facilitate string transformation. String transformation may be used in various situations and for various purposes. For example, a string transformation may be used to generate or search for an alternate string. The alternate string may be used to correct errors including spelling, expand searches, and reformulate queries, to name a few. This disclosure discusses techniques for developing a string transformation model as well as application of the model.

String transformation may be used in various applications where accuracy and speed may be desirable. However, known techniques often are only able to provide accuracy or speed, but not both. Various embodiments described herein provide accurate and fast string transformations. For example, a probabilistic approach to string transformation may achieve both high accuracy and efficiency. This approach may be particularly powerful when the scale of application is large.

Training data may be used to create and/or train a string transformation model. Various embodiments provide for a large amount of input strings and associated output strings to comprise the training data. This training data may be used to train probabilistic model, where the model may assign ranking scores to candidates associated with rules (or operators), where the rules may correspond to a change from a string or character to another string or character. For example, the best candidates for an output target string of an input string are defined as those candidates having a highest probabilistic score with respect to the training data and the rules.

Illustrative String Transformation Approach

Figure 1:
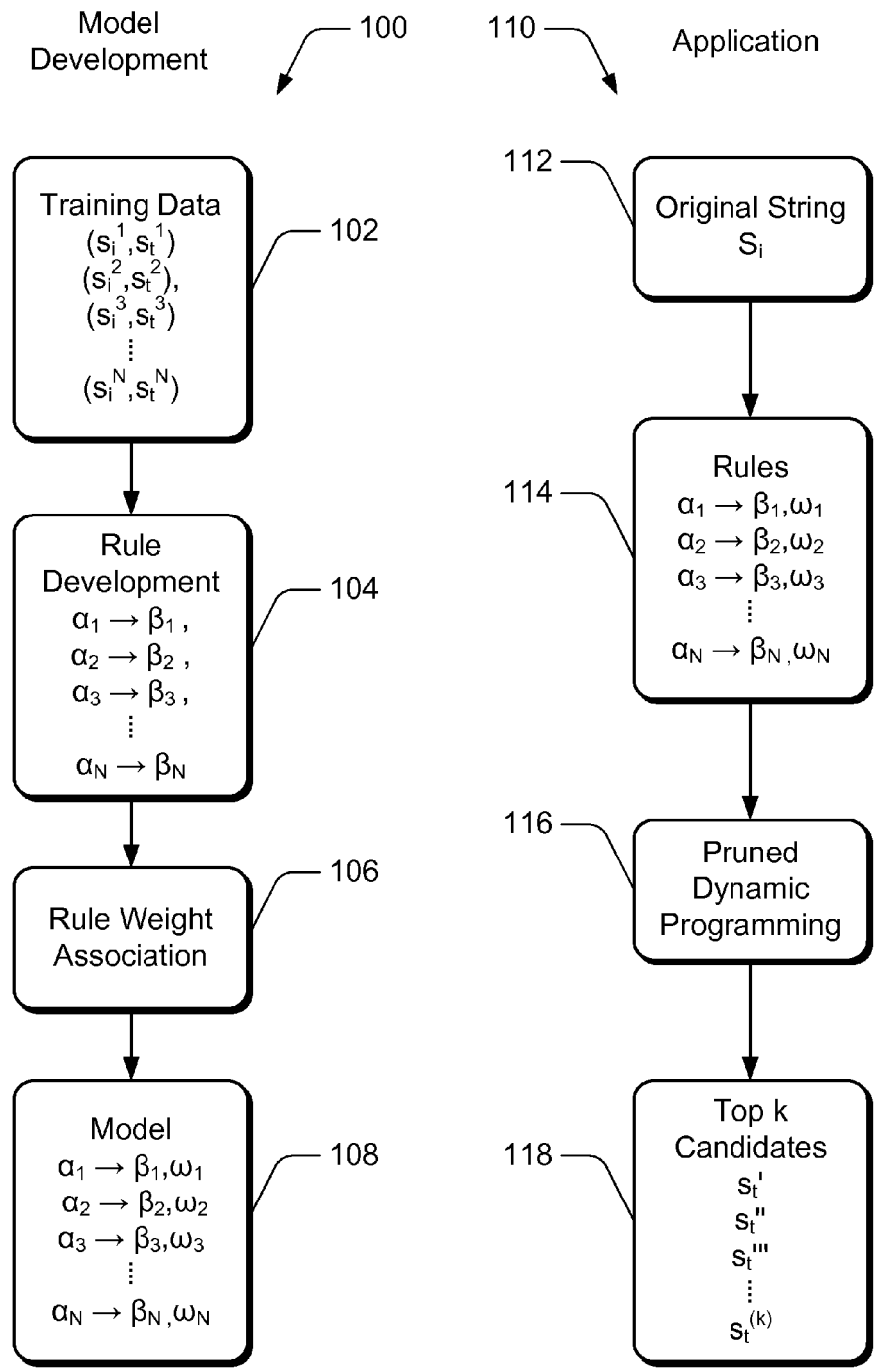
FIGS. 1A and 1B show illustrative embodiments of a process of transforming a string.

FIGS. 1A and 1B show illustrative embodiments of a process of transforming a string. For example, FIG. 1A shows a modeling process 100, where training data 102 is used to develop transformation rules 104. The training data may include, for example, a set of string pairs $(s_i^j, s_t^j)$ where $s_i^j$ may be an input string and $s_t^j$ may be a transformed string corresponding to the input string $s_i^j$. Transformation rules 104 may be developed by extracting rules (or operations) from the training data 102. For example, a rule α→β that replaces a substring α with a substring β may be determined. The rule development may also include expanding upon the extracted rules to include alternate and/or additional transformation rules. A weight 106 may be associated with a transformation rule 104. The weight 106 may be determined, for example, through a statistical analysis or probabilistic determination. The weight 106 may reflect a statistical probability that application of the associated rule will lead to a better string transformation. The transformation rules 104 and weights 106 may be used to construct a model 108 where the model 108 may be used to generate a string transformation. Further discussion of the model is provided below.

FIG. 1B shows an application process 110 of the model 108. For example, a set of candidate string transformations associated with an input may be requested. The set of candidate string transformations may correspond to a top number of candidates or a number of most likely candidates. Accordingly, a string transformation may be performed on an input, for example, an original string 112. Applicable transformation rules 114 may be selected based on the original string 112. Candidate string transformations may be developed by application of the applicable transformation rules 114 to the original string 112 where candidate string transformations may be eliminated from consideration before a set of candidate string transformations may be determined. Elimination may include elimination of individual candidate string transformations as well as elimination of branches of candidate string transformations. Elimination of branches of candidate string transformations may also be referred to as pruning. This elimination may provide for an increase in efficiency of string transformation. Further discussion of string transformation is provided below.

Figure 2:
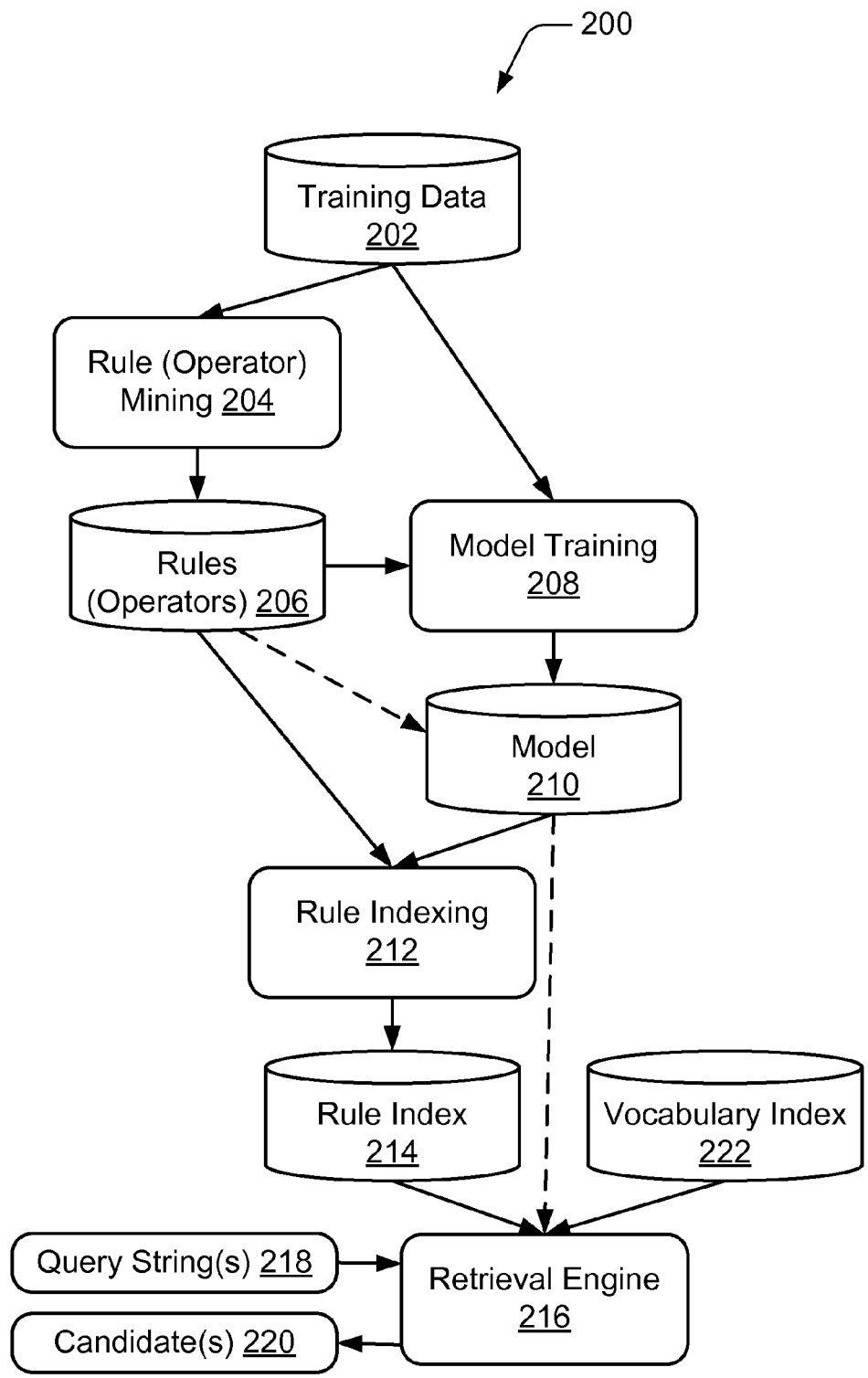
FIG. 2 shows an illustrative embodiment of a string transformation system.

FIG. 2 shows an illustrative embodiment of a string transformation system 200. String transformation system 200 may include training data 202, which may be used by a rule (or operator) mining module 204. The rule mining module 204 may generate rules 206 from the training data 202. The rule mining module 204 may generate rules 206 by direct extraction of rules, expansions of rules, and/or extrapolation of rules. A model training module 208 may generate a model 210 by evaluating the training data 202 and the rules 206. The model 210 may include weights associated with rules. The weights may relate to a statistical probability that a given rule, if applied, will be useful in generating a transformation string. In various embodiments, a rule indexing module 212 may index the rules 206 and the model 210 into a rule index 214. In various embodiments, the model 210 may comprise the rules 206 and weights associated with the rules 206, as, for example, indicated by the dashed lines in FIG. 2.

A retrieval engine module 216 may receive a request to generate alternate strings or perform a string transformation, for example, in the form of a query string 218. The retrieval engine module 216 may use transformation rules and associated weights from the rules index 214 to generate candidate or candidates 220. In various embodiments, the retrieval engine module 216 may use transformation rules and associated weights from the model 210 to generate candidate or candidates 220. Additionally or alternatively, the retrieval engine module 216 may leverage a vocabulary index 222 to generate candidates or candidates 220. The vocabulary index 222 may comprise, for example, dictionary entries and/or language models. In various embodiments, the vocabulary index 222 may be the same as, part of, or in addition to the training data 202 and vice versa.

Illustrative String Transformation Training and Model Development

Figure 3:
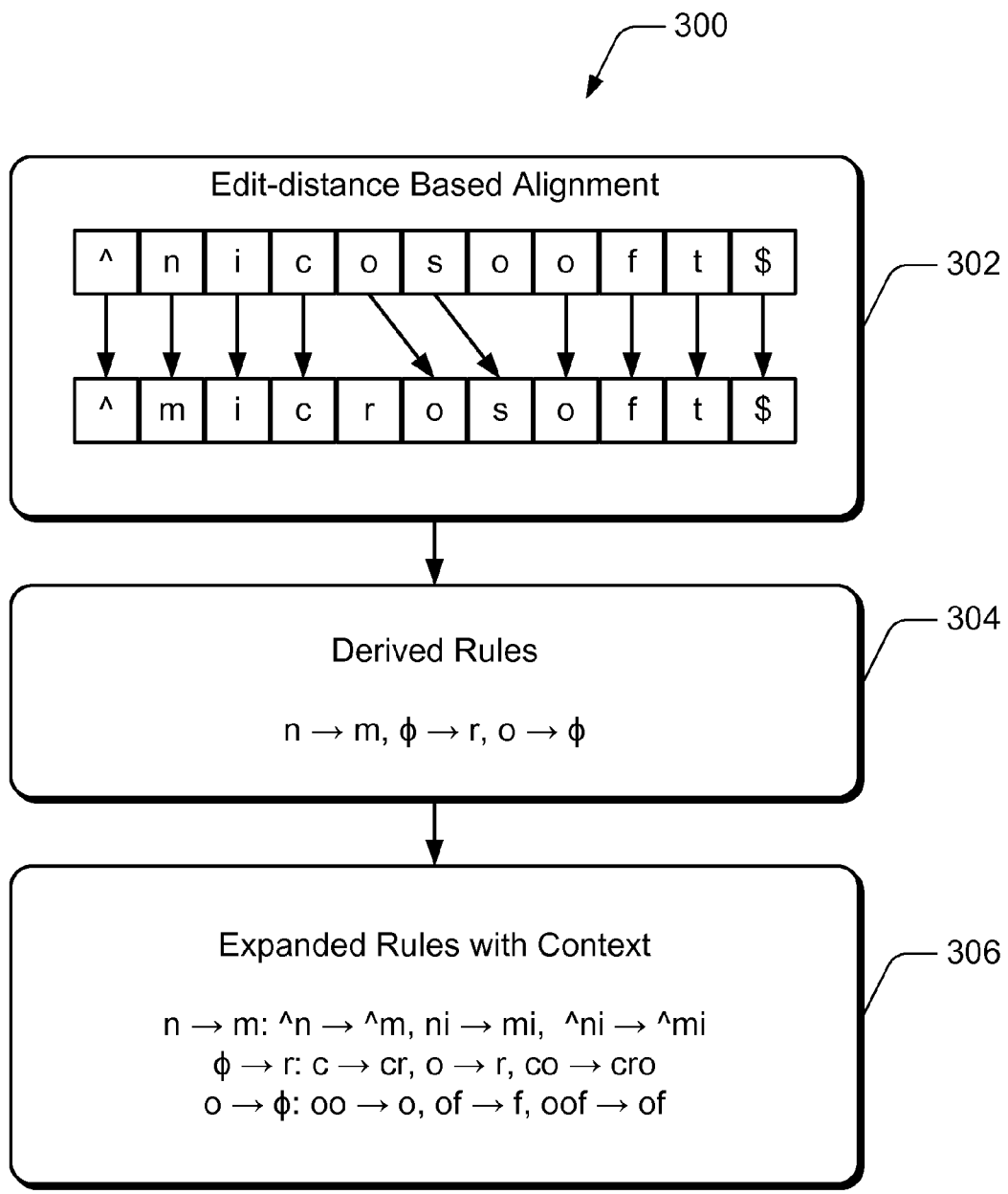
FIG. 3 shows an illustrative embodiment of string transformation rule development.

FIG. 3 shows an illustrative embodiment of string transformation rule development. Various embodiments contemplate character-level rules and/or word level rules. An embodiment of a character-level rule may comprise deriving the transformation rules based on character-level alignment. For example, a letter alignment may be based on the minimum edit-distance. FIG. 3 shows an example of a character-level alignment based at least in part on minimum edit-distance at 302 where a rule may be extracted and/or derived at 304. The extracted and/or derived rules may be expanded with surrounding characters, for example, at 306. Though FIG. 3 shows an example where +2, +1, 0, −1, −2 characters are considered, the range may be expanded to a large number in one or both directions or reduced in one or both directions. As the number is expanded, for example, the expanded rules with context may begin to form words, phrases, sentences, and other sizes of text. Additionally or alternatively, word level rules may be developed in a similar way.

Applying a set of rules to transform an input string $s_i$ to a candidate output target string $s_t$, the rule set may be called a "transformation" for the string pair $s_i$ and $s_t$. For a given string pair, it is possible that there are multiple possible transformations for it. For example, both "n"→"m" and "ni"→"mi" can transform "nicrosoft" to "microsoft."

Various embodiments provide that a maximum number of rules applicable to a word pair may be set to a fixed number. Accordingly, the number of possible transformations for a string pair may be limited. This may be considered reasonable since the number of differences between an input string and a target string will have a limit. In various embodiments, for example, the application of candidate generation in spelling error correction, the number of spelling errors in a word may be small. Similarly, in a query reformulation application, queries with the same intent are likely not to be quite different.

In various embodiments, given a string pair $(s_i, s_t)$, let $R(s_i, s_t)$ denote one transformation that can rewrite $s_i$ to $s_t$. There is likely a probabilistic mapping between the input string $s_i$ and target string $s_t$ plus transformation $R(s_i, s_t)$. The conditional probability distribution of $s_t$ and $R(s_i, s_t)$ given $s_i$ may be defined as the following log linear model:

$$P(s_t, R(s_i, s_t) \mid s_i) = \frac{\exp\left(\sum_{r \in R(s_i, s_t)} \lambda_r\right)}{\sum_{(s'_t, R(s_i, s'_t)) \in Z(s_i)} \exp\left(\sum_{o \in R(s_i, s'_t)} \lambda_o\right)} \quad (1)$$

where r or o denotes a rule in rule set R, $\lambda_r$ or $\lambda_o$ denotes a weight, and the normalization is carried over $Z(s_i)$, all pairs of string $s'_t$ and transformation $R(s_i, s'_t)$, such that $s_i$ can be transformed to $s'_t$ by $R(s_i, s'_t)$. As a result, a log linear model may provide an indication of whether a rule is applied or not through binary features.

Various embodiments provide that the weights in Equ. (1) may be any real numbers. Various embodiment provide that all the weights are non-positive, e.g., $\forall \lambda_r \leq 0$. The weights being limited to non-positive values may introduce a monotonicity in rule application and may imply that application of additional rules may not lead to generation of better candidates. For example, in a spelling error correction problem, both "office" and "officer" may be correct candidates of "ofice". However, "office" may be considered a better candidate (with higher probability) than "officer", since it needs one less rule to be applied. The criteria may be considered reasonable since a chance of making more errors is likely to be lower than that of making fewer errors. Experimental results have shown that the change in accuracy by applying criteria is negligible, but the gain in efficiency is large.

Various embodiments contemplate that a model may be trained where training data is given as a set of pairs $T=\{(s^j_i, s^j_t)\}_{j=1}^N$, where $s^j_i$ is an input string and $s^j_t$ is a transformation target of $s^j_i$. An objective of training may be to maximize the conditional probability $P(s^j_t, R(s^j_i,s^j_t)|s^j_i)$ over the training data.

This may not be considered a trivial problem since a "true" transformation $R^*(s^j_i,s^j_t)$ for each word pair $s^j_i$ and $s^j_t$ is likely not given in the training data. It is often the case that there may be multiple transformations applicable, and it may not be realistic to assume that such information can be provided by humans or automatically derived.

Various embodiments provide that the conditional probability of the target string given by the input string may be the sum of the conditional probability of all the transformations which can generate the target string. For example, $$P(s_t|s_i) = \sum_{R(s_i,s_t)} P(s_t, R(s_i, s_t)|s_i) \quad (2)$$

$$= \frac{\sum_{R(s_i,s_t)} \exp\left(\sum_{r \in R(s_i,s_t)} \lambda_r\right)}{\sum_{(s'_t, R(s_i,s'_t)) \in Z(s_i)} \exp\left(\sum_{o \in R(s_i,s'_t)} \lambda_o\right)}$$

Accordingly, the following objective function may be used:

$$\lambda^* = \underset{\lambda}{\operatorname{argmax}} L(\lambda) \quad (3)$$

$$= \underset{\lambda}{\operatorname{argmax}} \sum_j \log P(s_t|s_i)$$

where $\lambda$ denotes weight parameters.

Various embodiments may optimize Equ. 3. For example, a Newton method may aid in the optimization of Equ. (3). A bounded L-BFGS algorithm may be used for the optimization task. This algorithm may work well even when the number of weights $\lambda$ is large. A discussion of the algorithm may be found in Behm, et al., "Space-constrained gram-based indexing for efficient approximate string search," in Proceedings of the 2009 IEEE International Conference on Data Engineering. Washington, D.C., USA: IEEE Computer Society, 2009, pp. 604-615 which is incorporated by reference.

In various string transformation embodiments, given an input string $s_i$, a number k of target candidate string transformations may be found that can be transformed from $s_i$ and have the largest probabilities assigned by the transformation model. Different from the model development process, the weight parameters may be finite and the best transformation for each input string to any target string may be found. Therefore, the largest conditional probability among all the transformations may be used as the approximation of the sum of the conditional probability of all the transformations. A possible benefit of using a maximum formula instead of sum is an improvement in efficiency. Additionally, it may also enable use of pruning strategies.

$$P(s_t|s_i) = \sum_{R(s_i,s_t)} P(s_t, R(s_i, s_t)|s_i) \quad (4)$$

$$\approx \max_{R(s_i,s_t)} P(s_t, R(s_i, s_t)|s_i)$$

$$= \frac{\max_{R(s_i,s_t)} \exp\left(\sum_{r \in R(s_i,s_t)} \lambda_r\right)}{\sum_{(s'_t, R(s_i,s'_t)) \in Z(s_i)} \exp\left(\sum_{o \in R(s_i,s'_t)} \lambda_o\right)}$$

Here a ranking function to rank a candidate $s_t$ given an original string $s_i$ may be used.

$$\operatorname{rank}(s_t|s_i) = \max_{R(s_i,s_t)}(\Sigma_{r \in R(s_i,s_t)} \lambda_r) \quad (5)$$

For each possible transformation, a summation of the weights of the rules may be used in the transformation. The sum may be used as a ranking score, which may be considered equivalent to ranking candidates based on their largest conditional probabilities.

Illustrative String Transformation Generation Algorithm

Various embodiments provide for efficient candidate string transformation generation, for example, by returning a number k of top candidates. Various embodiments provide for use of dynamic programming and top k pruning, which, in some instances, are guaranteed to find an optimal k candidates. A rule index data structure may be used and will be discussed next. Further, use of dynamic programming and top k pruning will be discussed. Additionally, a dictionary matching algorithm will be discussed that may be useful, for example, when target strings are to be matched in a dictionary.

Various embodiments provide for a rule index data structure. For example, a rule index data structure may be based on an Aho-Corasick tree (AC tree). A discussion of the AC tree may be found in A. V. Aho and M. J. Corasick, "Efficient string matching: an aid to bibliographic search," Commun. ACM, vol. 18, pp. 333-340, June 1975 which is incorporated by reference. The AC tree may be used for storing and applying correction rules, referred to as rule index.

Various embodiments index some or all of the transformation rules based on an AC tree. One embodiment of the AC tree is a trie with "failure links", on which the Aho-Corasick string matching algorithm may be executed. The Aho-Corasick algorithm may be considered a dictionary matching algorithm, which can quickly locate all the words in a dictionary within an input string. Time complexity of the algorithm is of a linear order in length of the input string plus the number of matched entries.

Figure 4:
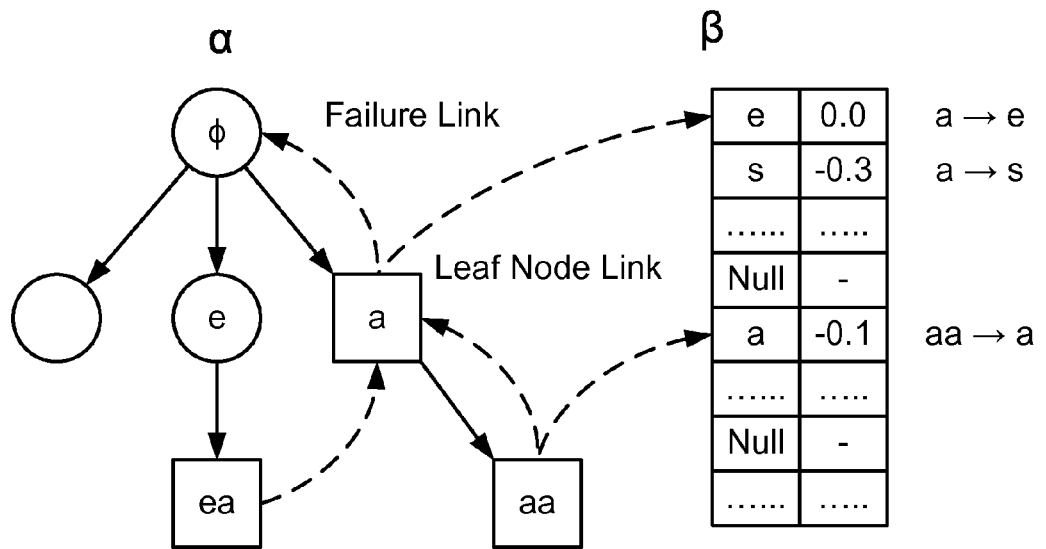
FIG. 4 shows an illustrative embodiment of an AC tree.

FIG. 4 shows an illustrative embodiment of an AC tree. For example, various embodiments provide that all of the α's are indexed in the rules on an AC tree. An α may correspond to a leaf node, and a β of the α may be stored in an associated list in decreasing order of rule weights λ, as illustrated in FIG. 4. Additionally, the index structure may use a trie, rather than a ranking list, to store β's associated with the same α.

Various embodiments provide for use of a dynamic programming and top k pruning techniques. For example, after applicable rules are selected, for example, from using an AC tree, dynamic programming and top k pruning may be used to generate candidate strings.

For example, an input string $s_i$ may have the segmentation of $^\wedge s^1 s^2 \ldots s^n \$$. The indicators $^\wedge$ and $\$$ may be flag segments denoting a head and tail of the string respectively. Strings may be segmented in different levels according to specific applications and different transformation rule sets. For example, in a spelling error correction application, a segment may be a letter, while each segment is a word in a query reformulation application.

Figure 5:
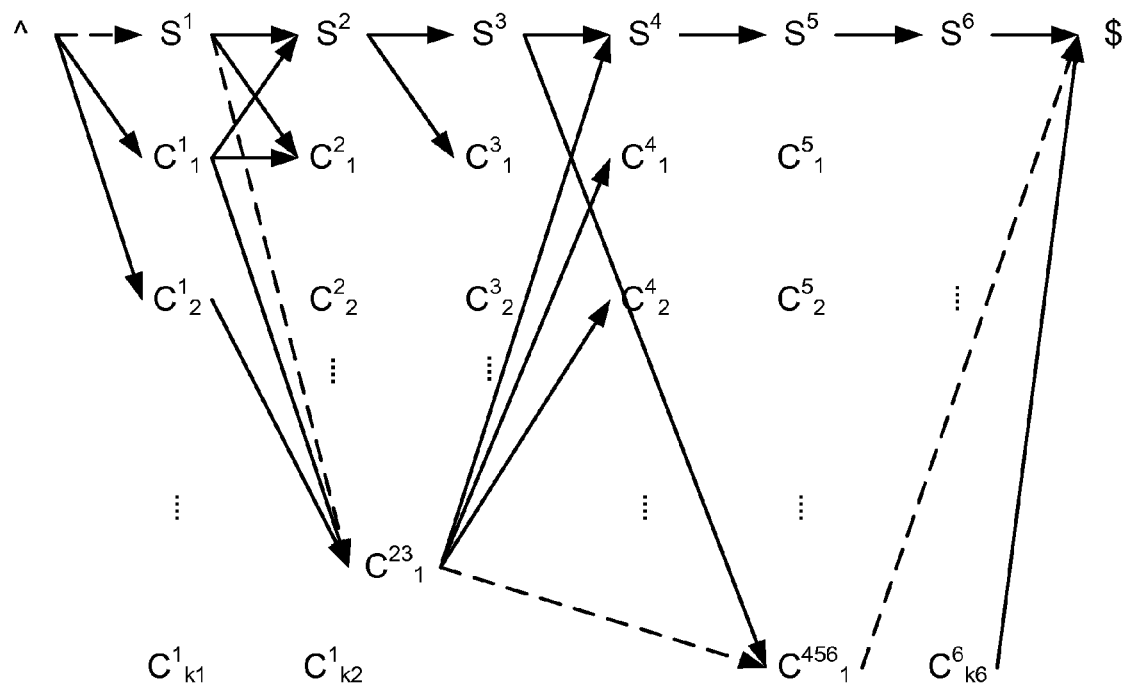
FIG. 5 shows an illustrative embodiment of a schematic of a lattice data structure.

FIG. 5 shows an illustrative embodiment of a schematic of a lattice data structure that may be used. For example, ˆ$s^2$ $s^2$ . . . $ represents an input query, and $c_k^{n_1 n_2}$ represents a candidate of substring $s^{n_1}s^{n_2}$ generated by the rule $s^{n_1}s^{n_2} \to c_k^{n_1 n_2}$. Paths from all the candidates of $s_n$ to all the candidates of $s^{n+1}$ may be set. Note that not all the paths are shown in FIG. 5.

In various embodiments, a path from ˆ to $ may generate one candidate string. For example, path ˆ$\to s^1 \to c_1^{23} \to c_1^{456} \to$ $ (shown as the dashed arrows in the FIG. 5) may generate candidate ˆ$s^1 c_1^{23} c_1^{456}$$ by applying rules $s^2 s^3 \to c_1^{23}$ and $s^4 s^5 s^6 \to c_1^{456}$. One could employ a standard Viterbi algorithm that tries all the possible paths from ˆ to $ to generate all the candidates. Then the function in Equ. (5) may be used to calculate the ranking scores of the candidates, and find the top k candidate strings. However, this algorithm may be less efficient than other embodiments discussed herein. For example, various embodiments contemplate employing pruning strategies to accelerate a search process to find the top k candidates.

FIG. 6 shows an illustrative embodiment of a dynamic programming and top k pruning algorithm 600. For example, a status structure comprises a triple (pos; string; score) to denote a status, corresponding to a current segment position, a current generated string, and a current ranking score. $S_{trace}$ may be a priority queue where statuses may be stored. $S_{trace}$ may be initialized with one status, for example, (1; ˆ; 0) (as shown on line 5 of FIG. 6). The current status may be expanded by trying to follow each path from a current position (as shown, for example, at lines 15-20 in FIG. 6). After one status is finished expanding, it may be dropped and another status may be retrieved from the priority queue $S_{trace}$ with heuristics (as shown, for example, at line 7 in FIG. 6).

A pruning strategy may be used, for example, to speed up the search process (as shown for example, at lines 8-9 in FIG. 6). In various embodiments, if the current ranking score of the applied rules is smaller than the smallest score in a top k list, the current status will be dropped and will not be expanded further. This pruning criterion may be derived from the non-positive constraint on the rule weights k. The ranking score may not become larger if the status is continued to expand since all of the weights are non-positive. Accordingly, in various cases, the pruning strategy is guaranteed to find the best k candidates in terms of the ranking scores since those candidates that cannot give better scores than the ones in the current top k list are pruned.

Another pruning strategy may be based on a local optimization characteristic of dynamic programming. For example, if two statuses have the same position (pos) and string, the status with larger ranking score is retained while the smaller one is eliminated (as shown, for example, at lines 21-22 in FIG. 6).

Effectiveness of the pruning strategies may depend on the heuristics for selecting a status option from $S_{trace}$. However, it is unlikely that an ideal selection strategy works for all datasets. For example, the following heuristics have performed well in experiments:

1) A status option is likely a better candidate if no transformation rule was applied at the preceding position (pos −1);
2) A status option is likely a better candidate if its position (pos) is larger; and
3) A status option is likely a better candidate if its score is higher.

In various embodiments, the upper heuristics may have a higher priority over lower heuristics. The status options may be sorted according to one or more of the heuristics and/or other heuristics. The status options may then be selected from $S_{trace}$ in order where the top/first status option is selected first.

In various embodiments, a dictionary may be used. For example, a candidate may be matched to a dictionary. If the candidate is not in the dictionary, that candidate may be eliminated. One approach may be to generate all possible candidate strings and then verify whether the candidate strings are in the dictionary. However, this approach is likely inefficient when compared to other approaches discussed herein. For example, various embodiments provide for the use of a trie structure to store and match candidates in the dictionary.

As discussed elsewhere, a path in the lattice from ˆ to $ may generate a candidate strings. A trie may be used to store candidate strings in the dictionary, where a candidate string may map to a leaf node in the trie. In various embodiments, the trie may be a prefix tree, where a prefix path in the lattice may map to a corresponding node in the trie. Various embodiments provide for traversing the trie at the same time as the candidate string path is chosen. Accordingly, traversing the trie at the same time, some paths may be dropped if the corresponding node cannot be found in the trie.

Figure 7:
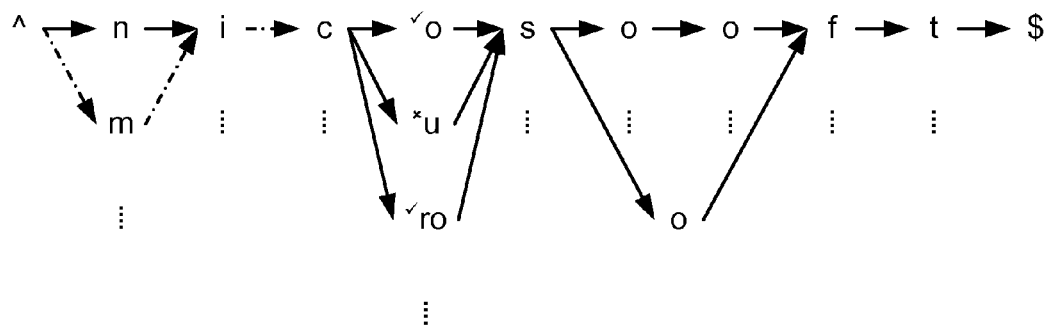
FIGS. 7 and 8 show an illustrative example of dictionary trie matching.
Figure 8:
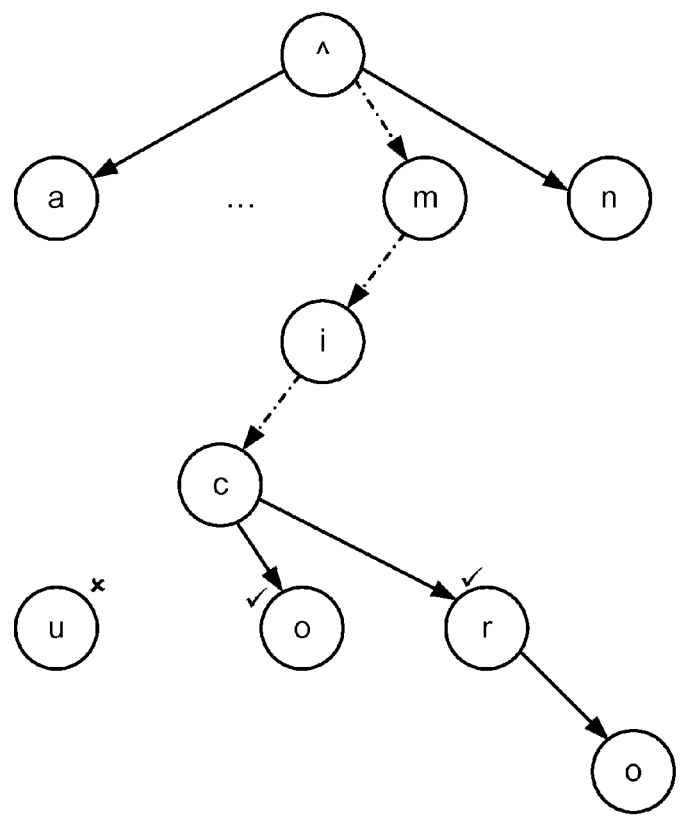

FIGS. 7 and 8 show an illustrative example of a dictionary trie matching. For example, a string of a current status may be "ˆmic." As a non-limiting example for illustrative purposes, three paths may be expanded, including c→o, c→u, and c→ro. However, in the dictionary trie, node c does not have a child node u, which means no string in the dictionary has prefix ˆmicu. In such a situation, the status with string ˆmicu may be eliminated and this status need not be further expanded. By eliminating this candidate string at an early stage, an increase in algorithm efficiency may be realized since, for example, since resources are not consumed following paths that are not capable of leading to a viable candidate.

Illustrative Training Data

Various embodiments provide for rule derivation and development based on training data. The training data may comprise various forms and content. Various embodiments provide for training based on a large amount of training data. However, a large amount may not be necessary in all embodiments and/or applications. For example, various embodiments may allow for a model and/or rule index to be generated without the use of training data.

In embodiments where training data is used, various sources may be used to generate the training data. The training data and data source may depend upon the application. For example, training data for spelling error correction may differ from training data for query reformulation. For example, Table 1 shows an illustrative example of a subset of training data that may be used to train an embodiment for spelling error correction. While Table 2 shows an illustrative example of a subset of training data that may be sued to train an embodiment for query reformulation.

TABLE 1

Illustrative Training Data

| Misspelled | Correct | Misspelled | Correct |
| --- | --- | --- | --- |
| aacoustic | acoustic | chevorle | chevrolet |
| liyerature | literature | tournemen | tournament |
| shinngle | shingle | newpape | newspaper |
| finlad | finland | ccomponet | component |
| reteive | retrieve | olimpick | olympic |

TABLE 2

Illustrative Training Data
Similar Query Pairs

| | |
|---|---|
| jobs hiring in cedar hill tx | jobs in cedar hill |
| define load | meaning of load |
| cheap cars in katy | used cars in katy |
| the best sega genesis games ever | top 10 best sega genesis games |

Sources of training data may come in various forms. For example, word pair mining may provide for the creation or capture of training data. For example, a web search may comprise a sequence of queries from the same user within a time period. Within the sequence of queries, a user may make a spelling error in one query and correct it in a latter query within a time period. Further, a user may query a phrase in one query and query an analogous, yet different formulation of a query in a later query within a time period. Heuristics may be used to determine string pairs and/or query pairs.

For example, two queries made more than a time period apart may be considered to be less likely as giving accurate training data. A time period may comprise five (5) min, however, it is appreciated that for a given context, a time period may be significantly longer or shorter. For example, a string query for a complex subject may warrant a longer time period, since a user may take longer to read some of the results, and decide how to reformulate the query for better and/or more applicable results. The time period may even span the entire session, and/or across multiple sessions of the user.

Heuristics that may be used to identify query pairs may include one or more of the following:

Two queries have the same number of words;

There is only one word difference between two queries; or

For two distinct words, the word in the first query is considered as misspelled and the second one as its correction.

Illustrative Computing Device and Illustrative Operational Environment

Figure 9:
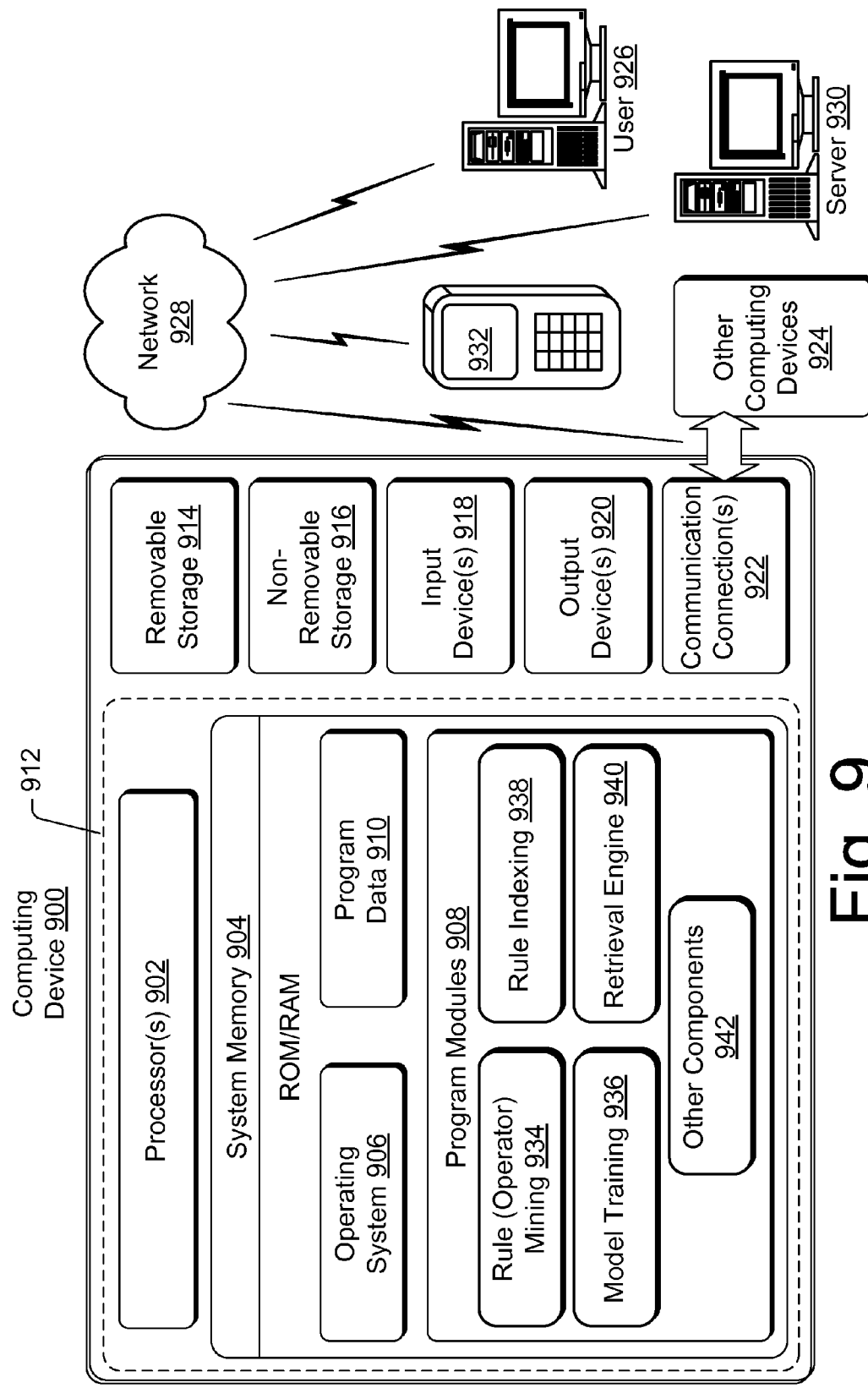
FIG. 9 shows an illustrative representative computing device and environment for performing string transformation generation.

FIG. 9 illustrates a representative computing device 900 that may, but need not necessarily be used to, implement the settings access system described herein, in accordance with various embodiments. The techniques and mechanisms described herein may be implemented by multiple instances of computing device 900 as well as by any other computing device, system, and/or environment. The computing device 900 shown in FIG. 9 is only one example of a computing device and is not intended to suggest any limitation as to the scope of use or functionality of any computing device utilized to perform the processes and/or procedures described above.

In at least one configuration, the computing device 900 includes at least one processor 902 and system memory 904. The processor(s) 902 may execute one or more modules and/or processes to cause the computing device 900 to perform a variety of functions. In some embodiments, the processor(s) 902 may include a central processing unit (CPU), a graphics processing unit (GPU), both CPU and GPU, or other processing units or components known in the art. Additionally, each of the processor(s) 902 may possess its own local memory, which also may store program modules, program data, and/or one or more operating systems.

Depending on the exact configuration and type of the computing device 900, the system memory 904 may be volatile (such as RAM), non-volatile (such as ROM, flash memory, miniature hard drive, memory card, or the like) or some combination thereof. The system memory 904 may include an operating system 906, one or more program modules 908, and may include program data 910. The computing device 900 is of a very basic illustrative configuration demarcated by a dashed line 912. Again, a terminal may have fewer components but may interact with a computing device that may have such a basic configuration.

Program modules 908 may include, but are not limited to, rule (operator) mining 934, model training 936, rule indexing 938, retrieval engine 940, and/or other components 942.

The computing device 900 may have additional features and/or functionality. For example, the computing device 900 may also include additional data storage devices (removable and/or non-removable) such as, for example, magnetic disks, optical disks, or tape. Such additional storage is illustrated in FIG. 9 by removable storage 914 and non-removable storage 916.

The storage devices and any associated computer-readable media may provide storage of computer readable instructions, data structures, program modules, and other data. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Moreover, the computer-readable media may include computer-executable instructions that, when executed by the processor(s) 902, perform various functions and/or operations described herein.

The computing device 900 may also have input device(s) 918 such as a keyboard, a mouse, a pen, a voice input device, a touch input device, etc. Output device(s) 920, such as a display, speakers, a printer, etc. may also be included.

The computing device 900 may also contain communication connections 922 that allow the device to communicate with other computing devices 924, such as over a network. By way of example, and not limitation, communication media and communication connections include wired media such as a wired network or direct-wired connections, and wireless media such as acoustic, radio frequency (RF), infrared, and other wireless media. The communication connections 922 are some examples of communication media. Communication media may typically be embodied by computer readable instructions, data structures, program modules, etc.

FIG. 9 also shows a schematic diagram of an illustrative operating environment where an illustrative system may operate. For example, string transformation system may operate on the computing device 900. The computing device 900 may interact with a user 926 directly or indirectly. The computing device may be connected to a network 928. The network device 928 may provide access to other computing devices 924 including a server 930, mobile devices 932, and/or other connections and/or resources. Connections may be wired or wireless.

The illustrated computing device 900 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, handheld or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Illustrative Processes

For ease of understanding, the processes discussed in this disclosure are delineated as separate operations represented as independent blocks. However, these separately delineated operations should not be construed as necessarily order dependent in their performance. The order in which the processes are described is not intended to be construed as a limitation, and any number of the described process blocks may be combined in any order to implement the process, or an alternate process. Moreover, it is also possible that one or more of the provided operations may be modified or omitted.

The processes are illustrated as a collection of blocks in logical flowcharts, which represent a sequence of operations that can be implemented in hardware, software, or a combination of hardware and software. For discussion purposes, the processes are described with reference to the system shown in FIGS. 1-9. However, the processes may be performed using different architectures and devices.

Figure 10:
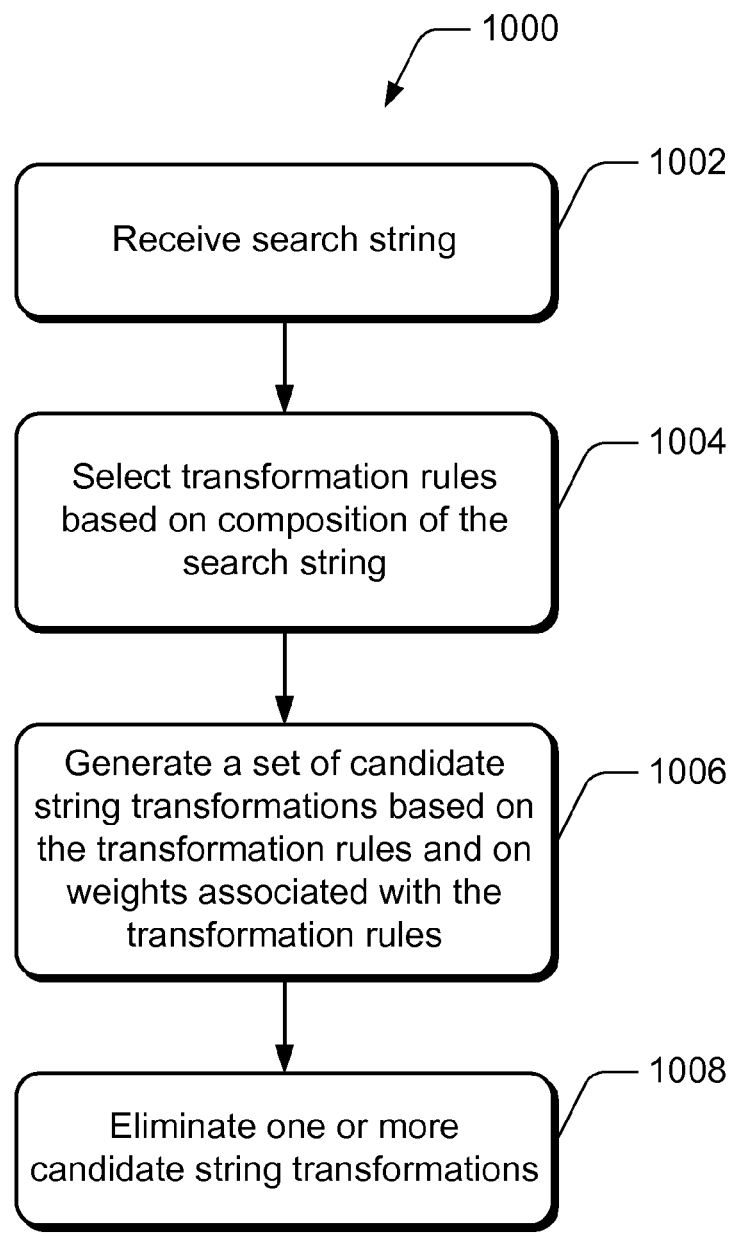
FIG. 10 shows a flow chart of an illustrative process of performing a search for candidate string transformations for a search string.

FIG. 10 shows a flow chart of an illustrative process 1000 of performing a candidate string search where candidates may be eliminated. For example, at 1002, a search string may be received. The search string may comprise various formats and contents. For example, the search string may be a word, a phrase, and/or a query.

At 1004, a plurality of transformation rules may be selected based at least in part on composition of the search string.

A 1006, a set of candidate string transformations may be generated based at least in part on the plurality of transformation rules and on weights associated with the plurality of transformation rules. For example, a candidate string transformation may be generated by applying selected transformation rule(s) to the search string. Further, the selected transformation rule(s) may be stored in, selected from, and/or applied through a prefix tree, for example, an Aho Corasick (AC) Tree. The selected transformation rule(s) may be selected based at least in part on composition of the search string. Further, the selected transformation rule(s) may be selected based at least in part on probabilities. Further, candidate string transformation construction and/or generation of candidate strings may comprise selecting a candidate string transformation, where the candidate string transformation may be under string construction, from a set of candidate string transformations under construction to continue string construction, where the selection may be based on heuristics. Further, the heuristics may be based at least in part of a status, the status comprising a current position in string construction and an intermediate score. For example, the heuristics may comprise one or more of the following:

Selecting a candidate string transformation under string construction where a selected transformation rule was absent in application to the candidate string transformation under string construction at a position in string construction preceding the current position in string construction;

Selecting a candidate string transformation under string construction where the current position in the string construction is larger than other candidate string transformations under string construction in the set of candidate string transformations under string construction; or Selecting a candidate string transformation under string construction where the intermediate score is higher than other candidate string transformations under string construction in the set of candidate string transformations under string construction.

Further, at 1006, a score may be associated with the constructed candidate string transformation. The score may be based at least in part on weights associated with the applied selected transformation rule(s).

At 1008, one or more candidate string transformations may be eliminated based at least in part on a score associated with the candidate string transformation. For example, a candidate string transformations may be eliminated based at least in part on traversing a dictionary tree where the candidate string may be eliminated if a corresponding node is absent from the dictionary tree. Further, a candidate string transformation by elimination of a branch of candidate string transformations. Additional, though not exhaustive, examples of eliminations may be found as described with respect to FIGS. 11-14.

Figure 11:
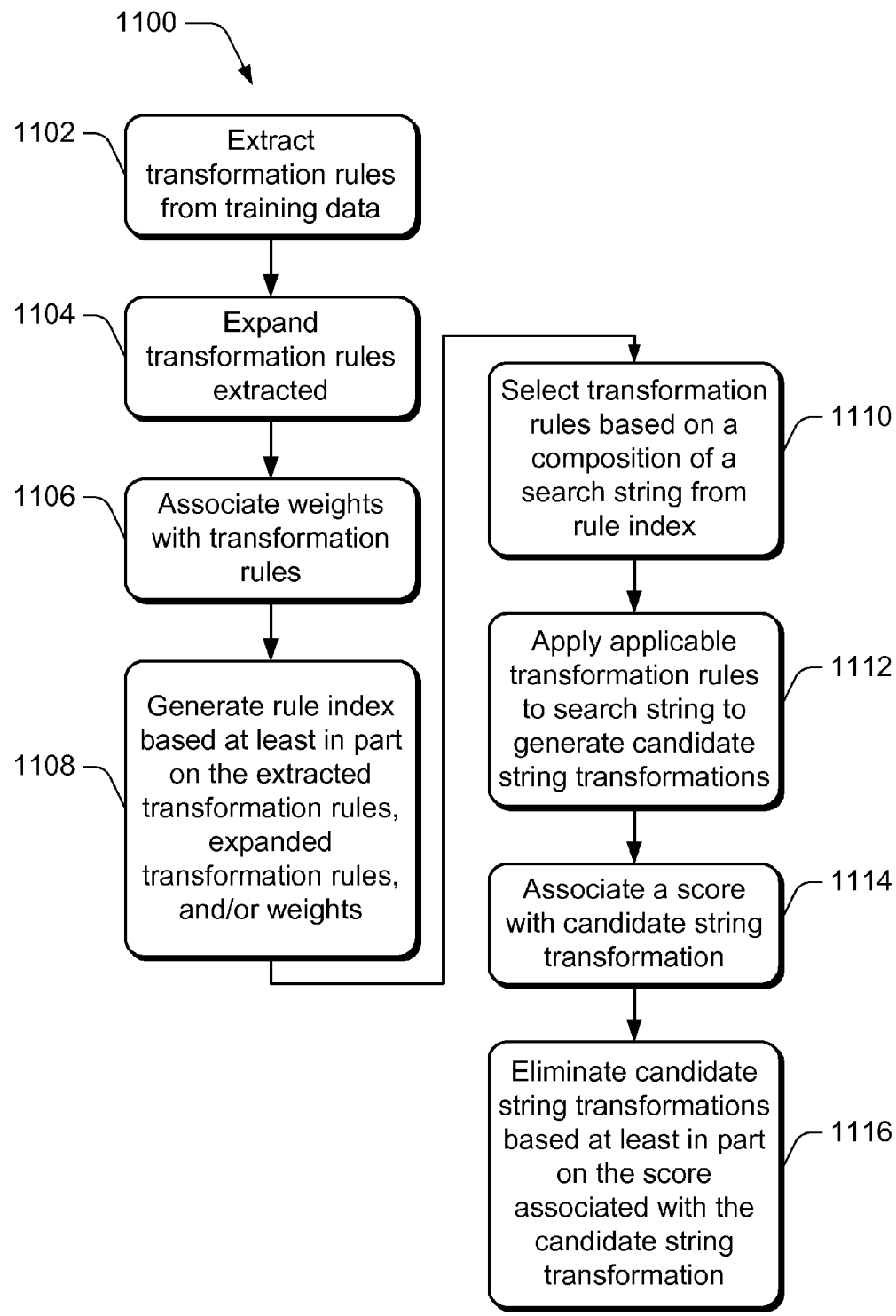
FIG. 11 shows a flow chart of an illustrative process of generating transformation rules and applying those rules to search strings to determine candidate string transformations for the search strings.

FIG. 11 shows a flow chart of an illustrative process 1100 of performing a candidate string search where a rule index may be created based at least in part on training data, where the rule index may be used to generate candidate string transformations. Further, the training data may comprise various formats including, for example, string pairs.

At 1102 and 1104, one or more transformation rules may be generated from the training data. At 1102 transformation rules from training data may be extracted. For example, the transformation rules may be extracted based at least in part on string alignment. The string alignment may comprise string alignment of the string pairs. Further, at 1104, the transformation rules extracted may be expanded and possibly generate additional transformation rules.

At 1106, weights may be associated with the transformation rules. The weights may be determined based at least in part on a conditional probability distribution of a set of transformational rules and the training data. For example, the weights may be based at least in part on a log linear probabilistic model where the weights may be non-positive real numbers.

At 1108, a rule index may be generated or assembled based at least in part on the one or more transformation rules, and/or weights.

At 1110, transformation rules may be selected from the rule index based at least in part on a composition of a search string. For example, transformation rules applicable to a search string may be selected or retrieved from the rule index.

At 1112, applicable transformation rules may be applied to the search string to generate candidate string transformations.

At 1114, a score may be associated with a candidate string transformation. For example, the score may be based at least in part on weights associated with the applicable transformation rules.

At 1116, candidate string transformations may be eliminated based at least in part on the score associated with the candidate string transformation.

Figure 12:
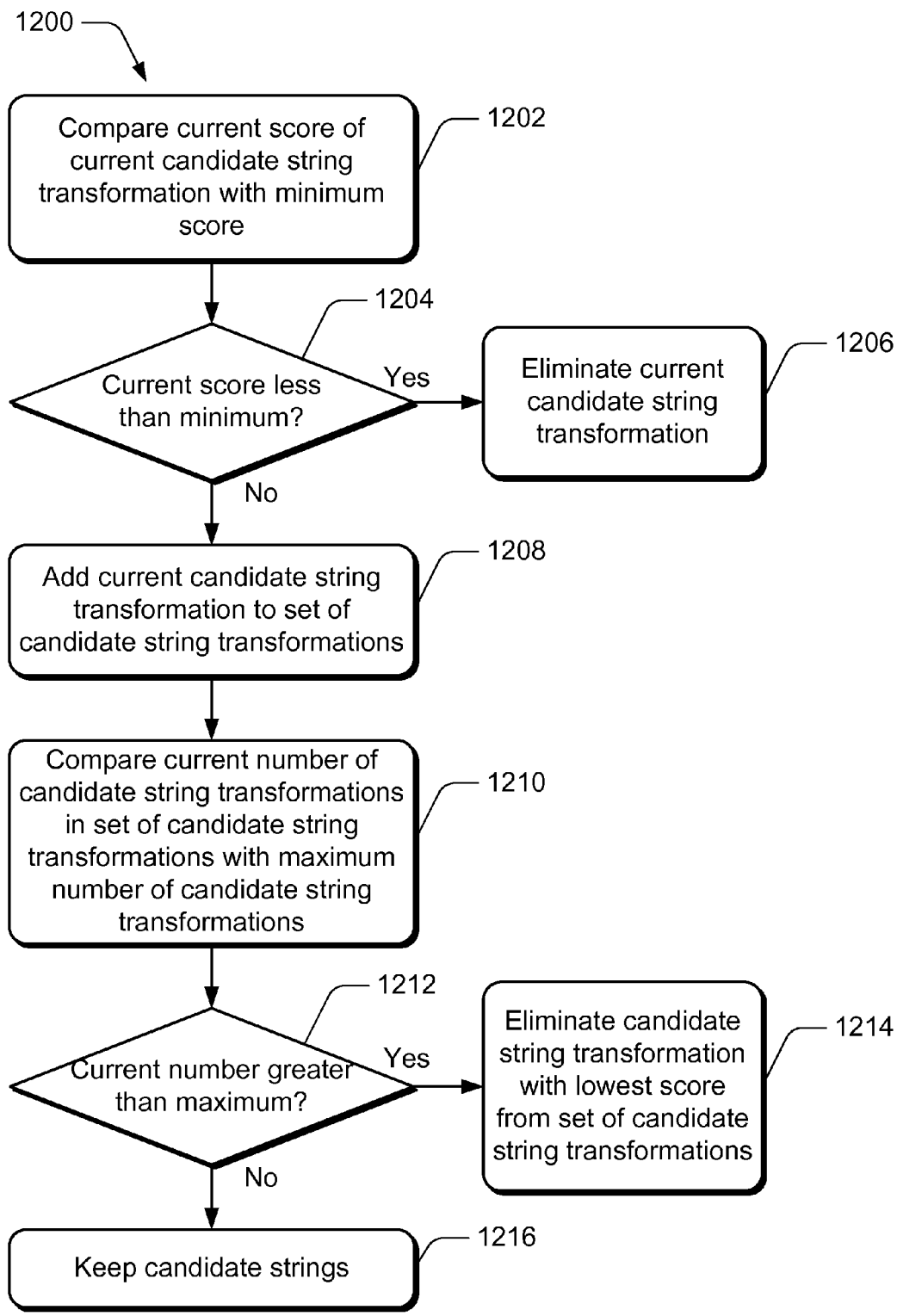
FIGS. 12-14 show flow charts of illustrative processes where candidate string transformations may be kept or eliminated.

FIG. 12 shows a flow chart of an illustrative process 1200 where candidate string transformations may be kept or eliminated. For example, at 1202, a current score of a current candidate string transformation is compared with a minimum score.

At 1204, if the current score is less than the minimum score, then at 1206 the current candidate string transformation may be eliminated. However, if the current score is not less than the minimum score, then at 1208, the current candidate string transformation may be added to a set of candidate string transformations.

At 1210, a current number of candidate string transformations in the set of candidate string transformations may be compared with a maximum number of candidate string transformations. Some embodiments may provide that the current number of candidate string transformations in the set of candidate string transformations may be compared only after a candidate string transformation is added to the set of candidate string transformations, for example as described at 1208.

At 1212, if the current number is greater than the maximum number of candidate string transformations, then at 1214, a preexisting candidate string transformation with a lowest score may be eliminated from the set of candidate string transformations. However, if the current number is not greater than the maximum number of candidate string transformations, then at 1216, the candidate string transformations may be kept in the set of candidate string transformations.

Figure 13:
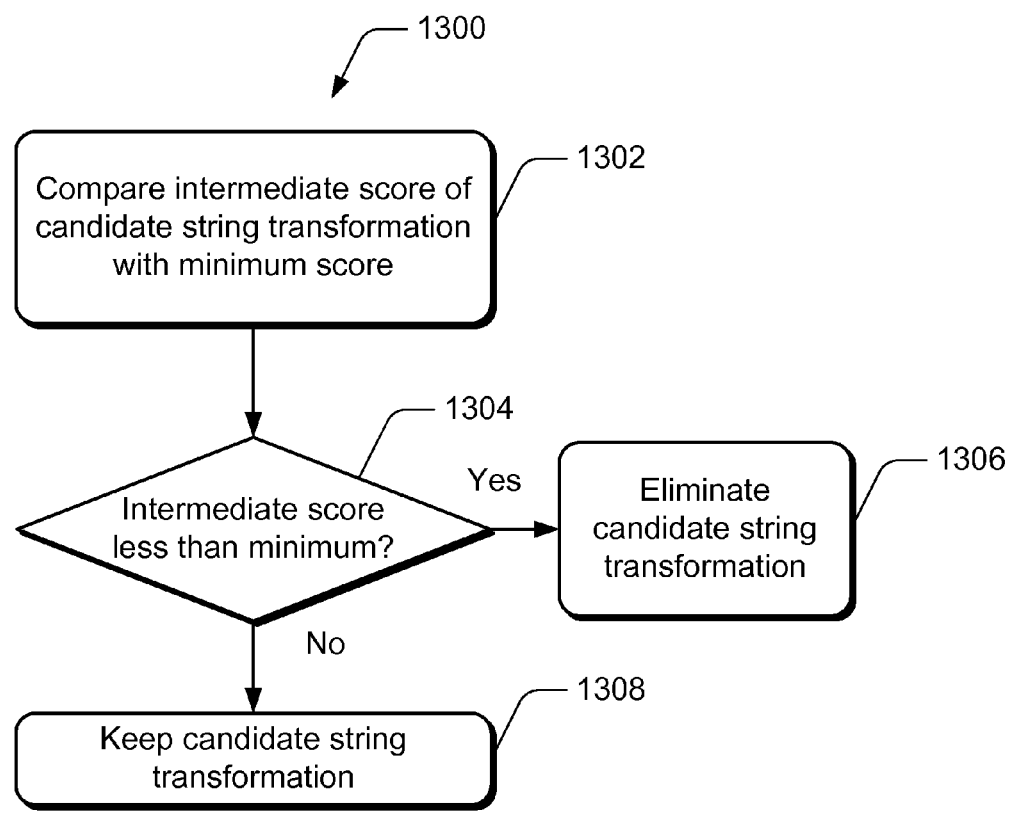

FIG. 13 shows a flow chart of an illustrative process 1300 where candidate string transformations may be kept or eliminated. For example, at 1302, an intermediate score of candidate string transformation is compared with a minimum score.

At 1304, if the intermediate score is less than the minimum score, then at 1306, the candidate string transformation may be eliminated. However, if the intermediate score is not less than the minimum, then at 1308, the candidate string transformation may be kept.

Figure 14:
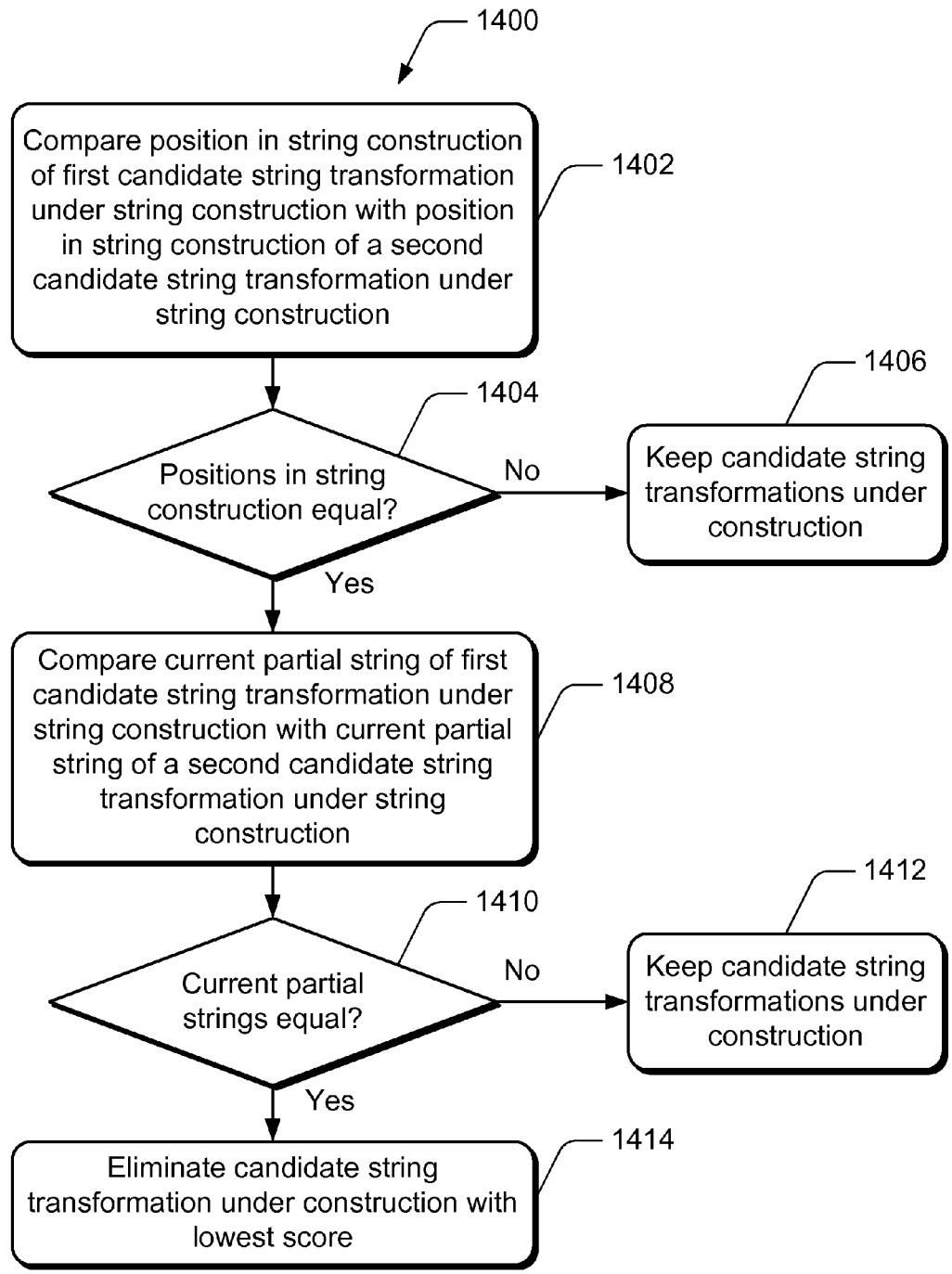

FIG. 14 shows a flow chart of an illustrative process 1400 where candidate string transformations may be kept or eliminated. For example, at 1402, a position in string construction of a first candidate string transformation under string construction is compared with a position in string construction of a second candidate string transformation under string construction.

At 1404, if the positions in the string construction are not equal, then at 1406, the candidate string transformations under construction may be kept. However, if the positions in the string construction are equal, then at 1408, the current partial string of the first candidate string transformation under string construction is compared with the current partial string of the second candidate string transformation under string construction.

At 1410, if the current partial strings are not equal, then at 1412, the candidate string transformations under construction may be kept. However, if the current partial strings are equal, then at 1414, the candidate string transformation under construction with the lowest score may be eliminated.

Conclusion

The subject matter described above can be implemented in hardware, software, or in both hardware and software. Although implementations have been described in language specific to structural features and/or methodological acts, it is to be understood that the subject matter defined in the appended claims is not necessarily limited to the specific features or acts described above. Rather, the specific features and acts are disclosed as example forms of implementing the claims. For example, the methodological acts need not be performed in the order or combinations described herein, and may be performed in any combination of one or more acts.

What is claimed is:

1. A system comprising:
one or more processors;
memory; and
programming instructions stored on the memory that, when executed by the one or more processors, configure the one or more processors to perform operations comprising:
receiving a search string;
selecting a plurality of transformation rules based on a composition of the search string; and
generating a set of candidate string transformations for the search string based on the plurality of transformation rules and on weights associated with the plurality of transformation rules, the weights being determined based on probability distributions of string pairs associated with the transformation rules,
the generating further comprising eliminating one or more candidate string transformations, the eliminating being based at least in part on a score associated with the candidate string transformation;
the eliminating comprises comparing an intermediate score of a candidate string transformation with a minimum score, wherein the candidate string transformation is eliminated if the intermediate score is less than the minimum score.

2. The system of claim 1, wherein the plurality of transformation rules are stored in, selected from, and/or applied through a prefix tree.

3. The system of claim 2, wherein the prefix tree comprises an Aho Corasick Tree.

4. The system of claim 1, wherein the weights associated with the applied selected transformation rules are based at least in part on probabilities.

5. The system of claim 1, wherein generating the set of candidate string transformations comprises associating a score with a candidate string transformation, the score being based at least in part on the weights associated with transformation rules applied to generate the candidate string transformation.

6. The system of claim 1, wherein the eliminating comprises traversing a dictionary tree with a candidate string transformation under string construction wherein the candidate string transformation is eliminated if a corresponding node is absent from the dictionary tree.

7. The system of claim 1, wherein eliminating candidate string transformations comprises eliminating a branch of candidate string transformations.

8. The system of claim 1, wherein:
the plurality of transformation rules are generated from training data; and
further comprising assembling at least a part of the plurality of transformation rules into a rules index based at least in part on the weights.

9. The system of claim 8, wherein the training data comprises string pairs.

10. The system of claim 8, wherein the generating of the plurality of transformation rules is based at least in part on string alignment of the string pairs.

11. The system of claim 8, wherein the generating of the plurality of transformation rules comprises expanding transformation rules extracted from training data.

12. The system of claim 8, wherein the generating a set of candidate string transformations is in response to a query string.

13. A method of string transformation, the method comprising:
under control of one or more processors configured with executable instructions,
generating one or more transformation rules from training data, the generating comprising extracting transformation rules from the training data and expanding the extracted transformation rules;
associating weights with the transformation rules, the weights determined based at least in part on a conditional probability distribution of a set of transformational rules and the training data, the conditional probability distribution being based in part on a log linear probabilistic model, the weights being non-positive real numbers;
assembling at least a part of the one or more transformation rules into a rules index based at least in part on the weights;
selecting a plurality of transformation rules based on a composition of a search string;
associating a score with a candidate string transformation, the score being based at least in part on the weights associated with transformation rules applied to generate the candidate string transformation;
eliminating a candidate string transformation, if a score of the candidate string transformation is less than a minimum score;
an intermediate score of the candidate string transformation is less than a minimum score; or
the intermediate score of the candidate string transformation is less than a second intermediate score of a second candidate string transformation, a current position of the candidate string transformation matches a second current position of the second candidate string transformation, and a current partial string of the candidate string transformation matches a second current partial string of the second candidate string transformation.

14. A system comprising:
one or more processors;
memory; and
programming instructions stored on the memory that, when executed by the one or more processors, configure the one or more processors to perform operations comprising:
receiving a search string;
selecting a plurality of transformation rules based on a composition of the search string;
generating a set of candidate string transformations for the search string based on the plurality of transformation rules and on weights associated with the plurality of transformation rules, the weights being determined based on probability distributions of string pairs associated with the transformation rules;
the generating further comprising eliminating one or more candidate string transformations, the eliminating being based at least in part on a score associated with the candidate string transformation; and
the eliminating comprising comparing a score of a current candidate string transformation with a minimum score, wherein:
the current candidate string transformation is eliminated if the score of the current candidate string transformation is less than the minimum score;
the current candidate string transformation is added to the set of candidate string transformations if the score of the current candidate string transformation is greater than the minimum score; or
a preexisting candidate string transformation in the set of candidate string transformations is eliminated if the preexisting candidate string transformation has a score equivalent to the minimum score and the set of candidate string transformations comprises a number of candidate string transformations greater than a maximum number of candidate string transformations.

15. A system comprising:
one or more processors;
memory; and
programming instructions stored on the memory that, when executed by the one or more processors, configure the one or more processors to perform operations comprising:
receiving a search string;
selecting a plurality of transformation rules based on a composition of the search string;
generating a set of candidate string transformations for the search string based on the plurality of transformation rules and on weights associated with the plurality of transformation rules, the weights being determined based on probability distributions of string pairs associated with the transformation rules;
the generating further comprising eliminating one or more candidate string transformations, the eliminating being based at least in part on a score associated with the candidate string transformation; and
the eliminating comprises comparing a first intermediate score of a first candidate string transformation under string construction with a second intermediate score of a second candidate string transformation under string construction, wherein the first or second candidate string transformation under string construction with a lower intermediate score is eliminated if current positions in string construction of the first and second candidate string transformation match and current partial strings of the first and second candidate string transformation match.

16. A system comprising:
one or more processors;
memory; and
programming instructions stored on the memory that, when executed by the one or more processors, configure the one or more processors to perform operations comprising:
receiving a search string;
selecting a plurality of transformation rules based on a composition of the search string;
generating a set of candidate string transformations for the search string based on the plurality of transformation rules and on weights associated with the plurality of transformation rules, the weights being determined based on probability distributions of string pairs associated with the transformation rules;
the generating a set of candidate string transformations further comprises selecting a candidate string transformation under string construction from a set of candidate string transformations under string construction to continue string construction based at least in part on heuristics, the heuristics are based at least in part on a status associated with the candidate string transformation under string construction;

the status associated with candidate string transformation under string construction comprises a current position in string construction and an intermediate score; and wherein the heuristics comprise:

selecting a candidate string transformation under string construction where a selected transformation rule was absent in application to the candidate string transformation under string construction at a position in string construction preceding the current position in string construction;

selecting a candidate string transformation under string construction where the current position in the string construction is larger than other candidate string transformations under string construction in the set of candidate string transformations under string construction; and/or selecting a candidate string transformation under string construction where the intermediate score is higher than other candidate string transformation under string construction in the set of candidate string transformations under string construction.

\* \* \* \* \*